United States Patent
Soler et al.

(10) Patent No.: US 12,509,741 B2
(45) Date of Patent: Dec. 30, 2025

(54) COLD ROLLED AND ANNEALED STEEL SHEET, METHOD OF PRODUCTION THEREOF AND USE OF SUCH STEEL TO PRODUCE VEHICLE PARTS

(71) Applicant: ArcelorMittal, Luxembourg (LU)

(72) Inventors: Michel Soler, Maizieres-les-Metz (FR); Xavier Garat, Homecourt (FR)

(73) Assignee: ArcelorMittal, Luxembourg (LU)

( * ) Notice: Subject to any disclaimer, the term of this patent is extended or adjusted under 35 U.S.C. 154(b) by 0 days.

(21) Appl. No.: 18/124,997

(22) Filed: Mar. 22, 2023

(65) Prior Publication Data

US 2023/0220509 A1 Jul. 13, 2023

Related U.S. Application Data

(63) Continuation of application No. 16/302,997, filed as application No. PCT/IB2017/000619 on May 23, 2017, now abandoned.

(51) Int. Cl.
| | |
|---|---|
| *B32B 15/01* | (2006.01) |
| *C21D 6/00* | (2006.01) |
| *C21D 8/02* | (2006.01) |
| *C21D 9/46* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/12* | (2006.01) |
| *C22C 38/38* | (2006.01) |

(52) U.S. Cl.
CPC .......... *C21D 8/0247* (2013.01); *B32B 15/013* (2013.01); *C21D 6/005* (2013.01); *C21D 6/008* (2013.01); *C21D 8/0263* (2013.01); *C21D 9/46* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/38* (2013.01); *C21D 8/0205* (2013.01); *C21D 8/0226* (2013.01); *C21D 8/0236* (2013.01); *C21D 2211/001* (2013.01); *C21D 2211/004* (2013.01); *C21D 2211/005* (2013.01)

(58) Field of Classification Search
CPC ........ C21D 2211/001; C21D 2211/004; C21D 2211/005; C21D 6/005; C21D 8/0205; C21D 8/0226; C21D 8/0236; C21D 8/0247; C21D 9/46; C22C 38/00; C22C 38/001; C22C 38/02; C22C 38/04; C22C 38/06; C22C 38/12; C22C 38/38
See application file for complete search history.

(56) References Cited

U.S. PATENT DOCUMENTS

| | | |
|---|---|---|
| 4,067,754 A | 1/1978 | Elias et al. |
| 4,968,357 A | 11/1990 | Liu et al. |
| 6,336,349 B1 | 1/2002 | Hauger et al. |
| 11,468,017 B2 | 10/2022 | Nuttle |
| 2003/0145911 A1 | 8/2003 | Hoffmann et al. |
| 2005/0006007 A1 | 1/2005 | Chao et al. |
| 2006/0033347 A1 | 2/2006 | Hauger et al. |
| 2006/0179638 A1 | 8/2006 | Engl et al. |
| 2006/0278309 A1 | 12/2006 | Bouzekri et al. |
| 2008/0035248 A1 | 2/2008 | Cugy et al. |
| 2008/0083477 A1* | 4/2008 | Drillet ............... C23C 2/0224 148/242 |
| 2008/0271823 A1 | 11/2008 | Hofmann et al. |
| 2009/0010793 A1 | 1/2009 | Becker et al. |
| 2009/0053556 A1 | 2/2009 | Sohn et al. |
| 2009/0165897 A1 | 7/2009 | McEwan |
| 2010/0037993 A1 | 2/2010 | Kim et al. |
| 2011/0308673 A1 | 12/2011 | Schneider et al. |
| 2013/0081740 A1* | 4/2013 | Liu .................. C22C 38/04 148/612 |
| 2013/0118647 A1 | 5/2013 | Berkhout et al. |
| 2013/0209831 A1 | 8/2013 | Becker et al. |
| 2013/0209833 A1 | 8/2013 | Scott et al. |
| 2013/0295409 A1 | 11/2013 | Chin et al. |
| 2014/0007922 A1 | 1/2014 | Balichev et al. |
| 2014/0134450 A1 | 5/2014 | Eberlein et al. |
| 2014/0251505 A1 | 9/2014 | Blumenau et al. |
| 2015/0147221 A1 | 5/2015 | Perlade et al. |
| 2015/0147589 A1 | 5/2015 | Bouaziz et al. |

(Continued)

FOREIGN PATENT DOCUMENTS

| | | |
|---|---|---|
| CN | 101490298 | 7/2009 |
| CN | 102939394 A | 2/2013 |

(Continued)

OTHER PUBLICATIONS

A Literature Review of Age Hardening Fe—Mn—Al—C Alloys R.A. Howell, Army Research Lab, and D.C. van Aken, Missouri University of Science and Technology (Year: 2009).*

(Continued)

*Primary Examiner* — Jenny R Wu
(74) *Attorney, Agent, or Firm* — Davidson Kappel LLC

(57) ABSTRACT

A cold rolled and annealed steel sheet includes by weight: 0.6≤C≤1.3%, 15.0≤Mn≤35%, 5≤Al≤15%, Si≤2.40%, S≤0.03%, P≤0.1%, N≤0.1%, possibly one or more optional elements chosen among Ni, Cr and Cu in an respective amount of up to 4.0%, up to 3.0% and up to 3.0% and possibly one or more elements chosen among B, Ta, Zr, Nb, V, Ti, Mo, and W in a cumulated amount of up to 2.0%, the remainder of the composition making up of iron and inevitable impurities resulting from the elaboration, the microstructure of the sheet including optionally up to 3% of kappa carbides, optionally up to 10.0% of granular ferrite, the remainder being made of austenite, the average grain size and average aspect ratio of the austenite being respectively below 6 μm and comprised between 1.5 and 6 and the average grain size and average aspect ratio of the ferrite, when present, being respectively below 5 μm and below 3.0.

35 Claims, No Drawings

(56) References Cited

U.S. PATENT DOCUMENTS

| | | |
|---|---|---|
| 2015/0152533 A1 | 6/2015 | Bongards et al. |
| 2015/0211088 A1 | 7/2015 | Kim et al. |
| 2016/0010173 A1 | 1/2016 | Scott et al. |
| 2016/0138146 A1 | 5/2016 | Braun et al. |
| 2016/0186285 A1* | 6/2016 | Kim .................. C22C 38/58 148/603 |
| 2016/0319388 A1* | 11/2016 | Kim .................. C22C 38/06 |
| 2019/0055622 A1* | 2/2019 | Chen .................. C21D 6/04 |
| 2019/0218639 A1 | 7/2019 | Scott et al. |
| 2019/0292616 A1 | 9/2019 | Scott et al. |
| 2019/0292617 A1 | 9/2019 | Lung et al. |
| 2019/0292622 A1 | 9/2019 | Garat et al. |
| 2019/0300978 A1 | 10/2019 | Soler et al. |

FOREIGN PATENT DOCUMENTS

| | | |
|---|---|---|
| CN | 103370434 A | 10/2013 |
| CN | 103820735 A | 5/2014 |
| CN | 104022248 A | 9/2014 |
| EP | 1 878 811 A1 | 1/2008 |
| EP | 2048256 A1 | 4/2009 |
| EP | 2 208 803 A1 | 7/2010 |
| EP | 3 088 548 A1 | 11/2016 |
| JP | 2001-79607 A | 3/2001 |
| JP | 2005-120399 A | 5/2005 |
| JP | 2006-44651 A | 2/2006 |
| JP | 2006-118000 A | 5/2006 |
| JP | 2006-176843 A | 7/2006 |
| JP | 2008-520830 A | 6/2008 |
| JP | 2014-501852 A | 1/2014 |
| JP | 2014-177662 A | 2/2014 |
| JP | 2015-507090 A | 3/2015 |
| JP | 2017-507242 A | 3/2017 |
| KR | 10-2009-0020278 A | 2/2009 |
| KR | 10-2013-011214 A | 10/2013 |
| KR | 10-2014-0013333 A | 2/2014 |
| KR | 10-2015-0075501 A | 7/2015 |
| RU | 2 329 308 C2 | 7/2008 |
| RU | 2 401 877 C2 | 10/2010 |
| RU | 2 524 027 C1 | 7/2014 |
| RU | 2554265 C2 | 6/2015 |
| RU | 2563066 C2 | 9/2015 |
| WO | WO 2009/084792 A1 | 7/2009 |
| WO | WO 2009/084793 A1 | 7/2009 |
| WO | WO-2015099221 A1 * | 7/2015 ............ C21D 6/005 |

OTHER PUBLICATIONS

Wolfgang Bleck et al., "New Methods in Steel Design," Metec 2015, Jun. 19, 2015.

Bartlett et al., "An Atom Probe Study of Kappa Carbide Precipitation and the Effect of Silicon Addition", (2014), Metallurgical and Materials Transactions A, vol. 45A, p. 2421-2435, DOI: 10.1007/s11661-014-2187-3 (Year: 2014).

Bartlett et al., "Effect of Phosphorus and Silicon on the Precipitation of K-carbides in Fe-30%Mn-9%Al-X%Si- 0.9%C-0.5%Mo Alloys" (2010), AFS Transactions 2010, American Foundry Society, p. 1-12, (Year: 2010).

Rana et al., "Overview of Lightweight Ferrous Materials: Strategies and Promises", (2014), JOM, vol. 66, No. 9, p. 1734-1746, DOI:DOI: 10.1007/s11837-014-1126-5 (Year: 2014).

Auriane E., et al., "Ferrite Effects in Fe—Mn—Al—C Triplex Steels", Metallurgical and Materials Transactions A: Physical Metallurgy & Materials Science, 45/1, pp. 324-334, Sep. 17, 2013 (Sep. 17, 2013).

Frommeyer Georg, Outside One person and Microstructures and Mechanical Properties of High-Strength Fe—Mn—Al-CLight-Weight TRIPLEX Steels, Steel Research International, Germany, Sep. 2006, and vol. 77 No.9/10, p. 627-633.

Kalashnikov, I.S & Acselrad, Oscar & Shalkevich, A & Chumakova, L. D & Pereira, Luiz. (2003). Heat treatment and thermal stability of FeMnAlC alloys. Journal of Materials Processing Technology. 136. 72-79. 10.1016/S0924-0136(02)00937-8. (Year: 2003).

* cited by examiner

COLD ROLLED AND ANNEALED STEEL SHEET, METHOD OF PRODUCTION THEREOF AND USE OF SUCH STEEL TO PRODUCE VEHICLE PARTS

This is a continuation of U.S. patent application Ser. No. 16/302,997 filed on Nov. 19, 2018 which is a National Phase of PCT/IB2017/000619, filed on May 23, 2017 which claims priority to International Patent Application PCT/IB2016/000697, filed May 24, 2016. All of the above are hereby incorporated by reference herein.

FIELD OF THE INVENTION

The present invention deals with a low density steel sheet presenting a microstructure mainly comprising austenite. The steel sheet according to the invention is particularly well suited for the manufacture of safety or structural parts for vehicles such as land motor vehicles.

BACKGROUND

Environmental restrictions are forcing automakers to continuously reduce the CO2 emissions of their vehicles. To do that, automakers have several options, whereby their principal options are to reduce the weight of the vehicles or to improve the efficiency of their engine systems. Advances are frequently achieved by a combination of the two approaches. This invention relates to the first option, namely the reduction of the weight of the motor vehicles. In this very specific field, there is a two-track alternative:

The first track consists of reducing the thicknesses of the steels while increasing their levels of mechanical strength. Unfortunately, this solution has its limits on account of a prohibitive decrease in the rigidity of certain automotive parts and the appearance of acoustical problems that create uncomfortable conditions for the passenger, not to mention the unavoidable loss of ductility associated with the increase in mechanical strength.

The second track consists of reducing the density of the steels by alloying them with other, lighter metals. Among these alloys, the low-density ones have attractive mechanical and physical properties while making it possible to significantly reduce the weight.

In particular, US 2003/0145911 discloses a Fe—Al—Mn—Si light steel having good formability and high strength. However, the ultimate tensile strength of such steels does not go beyond 800 MPa which does not allow taking full advantage of their low density for parts of all kinds of geometry.

SUMMARY OF THE INVENTION

A purpose of an embodiment of the present invention therefore is to provide a steel sheet presenting a density below 7.4, an ultimate tensile strength of at least 900 MPa, a yield strength of at least 700 MPa and a uniform elongation of at least 28%.

In a preferred embodiment, the steel sheet according to the present invention presents a density below 7.2, an ultimate tensile strength of at least 1000 MPa, a yield strength of at least 800 MPa and a uniform elongation of at least 30%.

This object can be achieved by providing a cold rolled and annealed steel sheet in accordance with a first embodiment of the present invention, A cold rolled and annealed steel sheet comprising by weight: $0.6 \leq C \leq 1.3\%$, $15.0 \leq Mn \leq 35\%$, $5 \leq Al \leq 15\%$, $Si \leq 2.40\%$ $S \leq 0.03\%$, $P \leq 0.1\%$, $N \leq 0.1\%$, possibly one or more optional elements chosen among Ni, Cr and Cu in an respective amount of up to 4.0%, up to 3.0% and up to 3.0% and possibly one or more elements chosen among B, Ta, Zr, Nb, V, Ti, Mo, and W in a cumulated amount of up to 2.0%, the remainder of the composition making up of iron and inevitable impurities resulting from elaboration, the microstructure of said sheet comprising optionally up to 3% of kappa carbides, optionally up to 10% of granular ferrite, the remainder being made of austenite, an average grain size of the austenite being below 6 μm, an average aspect ratio of the austenite being between 1.5 and 6, an average grain size of the ferrite, when present, being below 5 μm, and an average aspect ratio of the ferrite, when present, being below 3.0.

Another object can be achieved by providing a method for producing a steel sheet according to a second embodiment of the present invention, comprising A method for producing a steel sheet comprising: feeding a slab having a composition including, by weight: $0.6 \leq C \leq 1.3\%$, $15.0 \leq Mn \leq 35\%$, $5 \leq Al \leq 15\%$, $Si \leq 2.40\%$, $S \leq 0.03\%$, $P \leq 0.1\%$, $N \leq 0.1\%$, possibly one or more optional elements chosen among Ni, Cr and Cu in an respective amount of up to 4.0%, up to 3.0% and up to 3.0% and possibly one or more elements chosen among B, Ta, Zr, Nb, V, Ti, Mo, and W in a cumulated amount of up to 2.0%, the remainder of the composition making up of iron and inevitable impurities resulting from elaboration; reheating the slab at a temperature above 1000° C. and hot rolling the slab with a final rolling temperature of at least 800° C. to obtain a hot rolled steel sheet; coiling the hot rolled steel sheet at a temperature below 600° C.; cold-rolling such hot rolled steel sheet at a reduction comprised between 30 and 80%; and annealing such cold rolled sheet by heating it up to an annealing temperature between 700 and 1000° C., holding it at such temperature during less than 5 minutes and cooling it at a rate of at least 30° C./s.

Another aspect is achieved by providing parts or vehicles according to a third embodiment of the present invention comprising the steel sheets of the first or second embodiments.

Other characteristics and advantages of the invention will become apparent from the following detailed description of the invention.

DETAILED DESCRIPTION

Without willing to be bound by any theory it seems that the low density steel sheet according to the invention allows for an improvement of the mechanical properties thanks to this specific microstructure.

Regarding the chemical composition of the steel, carbon plays an important role in the formation of the microstructure and reaching of the targeted mechanical properties. Its main role is to stabilize austenite which is the main phase of the microstructure of the steel as well as to provide strengthening. Carbon content below 0.6% will decrease the proportion of austenite, which leads to the decrease of both ductility and strength of the alloy. However, since it is a main constituent element of the intragranular kappa carbide $(Fe,Mn)_3AlC_x$, a carbon content above 1.3% can promote the precipitation of such carbides in a coarse manner on the grain boundaries (intergranular kappa carbide $(Fe,Mn)_3AlC_x$), what results in the decrease of the ductility of the alloy.

Preferably, the carbon content is between 0.80 and 1.3%, more preferably between 0.8 and 1.0% by weight so as to obtain sufficient strength.

Manganese is an important alloying element in this system, mainly due to the fact that alloying with very high amounts of manganese and carbon stabilizes the austenite down to room temperature, which can then tolerate high amounts of aluminium without being destabilized and transformed into ferrite or martensite. To enable the alloy to have a superior ductility, the manganese content has to be equal or higher to 15%. However, when the manganese content is over 35%, the precipitation of β-Mn phase will deteriorate the ductility of the alloy. Therefore, the manganese content should be controlled to be equal or greater than 15.0%, but lower than equal to 35%. In a preferred embodiment, it is equal or greater than 15.5% or even than 16.0%. Its amount is more preferably between 18 and 25%.

Aluminium addition to high manganese austenitic steels effectively decreases the density of the alloy. In addition, it considerably increases the stacking fault energy (SFE) of the austenite, leading in turn to a change in the strain hardening behavior of the alloy. Aluminium is also one of the primary elements of nanosized kappa carbide $(Fe,Mn)_3AlC_x$ and therefore its addition significantly enhances the formation of such carbides. The aluminium concentration of the present alloys should be adjusted, on one hand, to guarantee the austenite stability and the precipitation of kappa carbides, and on the other to control the formation of ferrite. Therefore, the aluminium content should be controlled to be equal or greater than 5%, but lower than equal to 15%. In a preferred embodiment, aluminium content is between 7 and 12% and preferably between 8 and 10%.

Silicon is a common alloying element for high manganese and aluminium steels. It has a very strong effect on the formation of ordered ferrite with a $D0_3$ structure. Besides, silicon was shown to enhance the activity of carbon in austenite and to increase the partitioning of carbon into the kappa carbides. In addition, silicon has been described as an effective alloying element that can be used to delay or prevent the precipitation of brittle β-Mn phase. However, above a content of 2.40%, it reduces the elongation and tends to form undesirable oxides during certain assembly processes, and it must therefore be kept below this limit. Preferably, the content of silicon is below 2.0% and advantageously below 1.0.

Sulfur and phosphorus are impurities that embrittle the grain boundaries. Their respective contents must not exceed 0.03 and 0.1% so as to maintain sufficient hot ductility.

Nitrogen content must be 0.1% or less so as to prevent the precipitation of AlN and the formation of volume defects (blisters) during solidification.

Nickel has a positive effect on penetration of hydrogen into the steel and, therefore it can be used as a diffusion barrier to hydrogen. Nickel can also be used as an effective alloying element because it promotes the formation of ordered compounds in ferrite, such as the B2 component, leading to additional strengthening. However, it is desirable, among others for cost reasons, to limit the nickel addition to a maximum content of 4.0% or less and preferably between 0.1 and 2.0% or between 0.1 and 1.0%. In another embodiment, the nickel amount is below 0.1%.

Chromium may be used as optional element for increasing the strength of the steel by solution hardening. It also enhances the high temperature corrosion resistance of the steels according to the invention. However, since chromium reduces the stacking fault energy, its content must not exceed 3.0% and preferably between 0.1% and 2.0% or between 0.1 and 1.0%. In another embodiment, the chromium amount is below 0.1%.

Likewise, optionally, an addition of copper with a content not exceeding 3.0% is one mean of hardening the steel by precipitation of copper rich precipitates. However, above this content, copper is responsible for the appearance of surface defects in hot-rolled sheet. Preferably, the amount of copper is between 0.1 and 2.0% or between 0.1 and 1.0%. In another embodiment, the chromium amount is below 0.1%.

Boron has a very low solid solubility and a strong tendency to segregate at the grain boundaries, interacting strongly with lattice imperfections. Therefore, boron can be used to limit the precipitation of intergranular kappa carbides. Preferably, the amount of boron is below 0.1%.

Niobium can simultaneously increase strength and toughness in the steel since it is an effective grain refiner. In addition, tantalum, zirconium, niobium, vanadium, titanium, molybdenum and tungsten are also elements that may optionally be used to achieve hardening and strengthening by precipitation of nitrides, carbo-nitrides or carbides.

However, when their cumulated amount is above 2.0%, preferably above 1.0%, there is a risk that an excessive precipitation may cause a reduction in toughness, which has to be avoided.

The microstructure of the steel sheet according to the invention comprises optionally up to 3% of kappa carbides, optionally up to 10% of granular ferrite, the remainder being made of austenite.

The austenitic matrix presents an average grain size below 6 μm and preferably below 4 μm, more preferably below 3 μm and has an average aspect ratio between 1.5 and 6, preferably between 2.0 and 4.0 and more preferably between 2.0 and 3.0.

During quenching, possible modulations in austenitic grains may indicate the beginning of L'12 ordering and thus, the presence of intragranular kappa carbides. Therefore, kappa carbides $(Fe,Mn)_3AlC_x$ can be present in the microstructure of the steel sheet according to the invention, up to an amount of 3% in area fraction. The presence of intergranular kappa carbides is not admitted as such intergranular coarse kappa carbides may cause a decrease in the ductility of the steel.

Ferrite can also be present in the microstructure of the sheet according to the invention up to an amount of 10.0% in area fraction, preferably up to 5.0% or more preferably up to 3.0%. However, the ferrite morphology is limited to a granular geometry, excluding ferrite in form of bands, as they drastically degrade the ductility and formability of the steel. When present, the ferritic grains have an average grain size below 5 μm and preferably below 1 μm. The average aspect ratio of the ferrite, when present, is below 3.0 and preferably below 2.5. Such ferrite can be under the form of regular disorder ferrite α or ordered as a B2 structure with a (Fe,Mn)Al composition or as a $D0_3$ structure with a $(Fe,Mn)_3Al$ composition, so that α, B2 and $D0_3$ structures can be observed in the steel according to the invention.

To protect the steel sheet according to the invention from corrosion, in a preferred embodiment, the steel sheet is covered by a metallic coating. The metallic coating can be an aluminum-based coating or a zinc-based coating.

Preferably, the aluminium-based coated comprises less than 15% Si, less than 5.0% Fe, optionally 0.1 to 8.0% Mg and optionally 0.1 to 30.0% Zn, the remainder being Al.

Advantageously, the zinc-based coating comprises 0.01-8.0% Al, optionally 0.2-8.0% Mg, the remainder being Zn.

The steel sheet according to the invention can be produced by any appropriate manufacturing method and the man skilled in the art can define one. It is however preferred to use the method according to the invention, which comprises the following steps:

- feeding a slab which composition is according to the invention
- reheating such slab at a temperature above 1000° C. and hot rolling it with a final rolling temperature of at least 800° C.,
- coiling the hot rolled steel sheet at a temperature above 350° C.,
- cold-rolling such hot rolled steel sheet at a reduction comprised between 30 and 80%,
- annealing such cold rolled sheet by heating it up to an annealing temperature comprised between 700 and 1000° C., holding it at such temperature during less than 5 minutes and cooling it at a rate of at least 30° C./s.

The steel sheets according to the present invention are preferably produced through a method in which an semi product, such as slabs, thin slabs, or strip made of a steel according to the present invention having the composition described above, is cast, the cast input stock is heated to a temperature above 1000° C., preferably above 1050° C. and more preferably above 1100° C. or 1150° C. or used directly at such a temperature after casting, without intermediate cooling.

The final hot-rolling step is performed at a temperature above 800° C. To avoid any cracking problem through lack of ductility by the formation of ferrite in bands, the end-of-rolling temperature is preferably above or equal to 850° C.

After the hot-rolling, the strip has to be coiled at a temperature below 600° C. and preferably above 350° C. In a preferred embodiment, the coiling is performed between 350 and 450° C. to avoid excessive kappa carbide precipitation.

The hot-rolled product obtained by the process described above is cold-rolled after a possible prior pickling operation has been performed in the usual manner.

The cold-rolling step is performed with a reduction rate between 30 and 80%, preferably between 50 and 70%.

After this rolling step, a short annealing is performed by heating the sheet up to an annealing temperature comprised between 700 and 1000° C., holding it at such temperature during less than 5 minutes and cooling it at a rate of at least 30° C./s, more preferably of at least 50° C./s and even more preferably of at least 70° C./s. Preferably, this annealing is carried out continuously. By controlling annealing temperature and time, either a fully austenitic or a two phase structure with the characteristics above can be obtained.

After this annealing step, the steel sheet may optionally be submitted to a metallic coating operation to improve its protection against corrosion. The coating process used can be any process adapted to the steel of the invention. Electrolytic or physical vapor deposition can be cited, with a particular emphasis on Jet Vapor Deposition. The metallic coating can be based on zinc or on aluminium, for example.

EXAMPLES

Nine grades, which compositions are gathered in table 1, were cast in slabs and processed following the process parameters gathered in table 2.

TABLE 1

| | Compositions | | | | | | | |
|---|---|---|---|---|---|---|---|---|
| Grade | C | Mn | Al | Si | V | S | P | N |
| A | 0.887 | 24.90 | 8.70 | 0.217 | — | 0.004 | 0.025 | 0.0017 |
| B | 0.920 | 28.88 | 9.37 | 0.035 | — | 0.007 | 0.011 | 0.0009 |
| C | 0.920 | 19.15 | 8.65 | 0.050 | — | 0.003 | 0.009 | 0.0057 |
| D | 0.360 | 28.88 | 9.52 | 0.040 | — | 0.010 | 0.011 | 0.0013 |
| E | 0.560 | 29.06 | 9.57 | 0.040 | — | 0.012 | 0.011 | 0.0010 |
| F | 0.900 | 19.65 | 8.32 | 0.045 | 0.180 | 0.010 | 0.010 | 0.005 |
| G | 1.130 | 26.75 | 9.95 | 0.031 | — | 0.010 | 0.010 | 0.004 |
| H | 0.900 | 19.54 | 8.81 | 0.041 | — | 0.008 | 0.010 | 0.003 |
| I | 0.900 | 22.79 | 8.58 | 0.041 | — | 0.007 | 0.010 | 0.003 |

TABLE 2

| | | Process parameters | | | | | | | |
|---|---|---|---|---|---|---|---|---|---|
| | | Hot | | | | Cold | Annealing | | |
| Trial | Grade | Reheating T (° C.) | rolling finish T (° C.) | Cooling rate (° C./s) | Coiling T (° C.) | rolling reduction (%) | T (° C.) | Holding time (min) | Cooling rate (° C./s) |
| 1 | A | 1170 | 890 | 75 | 400 | 58 | 850 | 3 | 80 |
| 2 | B | 1170 | 985 | 75 | 400 | 64 | 875 | 3 | 80 |
| 3 | C | 1170 | 996 | 80 | 400 | 61 | 850 | 3 | 80 |
| 4 | D | 1170 | 940 | 80 | 400 | 62 | 875 | 3 | 80 |
| 5 | E | 1170 | 950 | 80 | 400 | 63 | 875 | 3 | 80 |
| 6 | B | 1170 | 985 | 75 | 400 | 55 | 875 | 10 | 80 |
| 7 | F | 1170 | 990 | 70 | 400 | 63 | 850 | 1 | 355 |
| 8 | F | 1170 | 990 | 70 | 400 | 63 | 850 | 3 | 355 |
| 9 | F | 1170 | 990 | 70 | 400 | 63 | 850 | 3 | 8 |
| 10 | F | 1170 | 990 | 70 | 400 | 63 | 825 | 3 | 8 |
| 11 | F | 1170 | 990 | 70 | 400 | 63 | 825 | 1 | 8 |
| 12 | G | 1170 | 970 | 70 | 400 | 60 | 975 | 3 | 60 |
| 13 | H | 1170 | 980 | 70 | 400 | 58 | 850 | 3 | 8 |
| 14 | H | 1170 | 980 | 4 | 400 | 58 | 850 | 3 | 60 |
| 15 | I | 1170 | 955 | 4 | 400 | 59 | 875 | 3 | 60 |

The resulting samples were then analyzed and the corresponding microstructure elements and mechanical properties were respectively gathered in table 3 and 4.

TABLE 3

Microstructure

| Trial | Austenite (%) | Regular ferrite (%) | Ferrite shape | Kappa carbides (%) | Austenite grain size (μm) | Austenite aspect ratio | Ferrite grain size (μm) | Ferrite aspect ratio |
|---|---|---|---|---|---|---|---|---|
| 1 | 95 | 5 | granular | Yes < 3% | 2.30 | 2.36 | 0.54 | 1.81 |
| 2 | 100 | — | — | Yes < 3% | 2.38 | 2.60 | — | — |
| 3 | 98.7 | 1.3 | granular | Yes < 3% | 2.04 | 2.44 | 0.47 | 1.80 |
| 4 | 65 | 35 | large bands | No | 2.50 | 2.53 | — | — |
| 5 | 80 | 20 | bands | No | 2.44 | 2.87 | 2.22 | 3.54 |
| 6 | 100 | — | — | No | 2.20 | 1.4 | — | — |
| 7 | 96 | 4 | granular | Yes < 3% | 1.9 | 1.9 | 0.48 | 1.7 |
| 8 | 96 | 4 | granular | Yes < 3% | 2.1 | 1.9 | 0.54 | 1.8 |
| 9 | 88 | 12 | granular | Yes < 3% | 2.1 | 1.9 | 0.54 | 1.8 |
| 10 | 85 | 15 | granular | Yes < 3% | 1.9 | 1.9 | 0.54 | 1.75 |
| 11 | 85 | 15 | granular | Yes < 3% | 1.8 | 1.9 | 0.45 | 1.75 |
| 12 | 100 | 0 | — | Yes < 3% | 2.8 | 2.0 | — | — |
| 13 | 88 | 12 | granular | Yes < 3% | 1.95 | 2.05 | 0.45 | 1.9 |
| 14 | 94 | 6 | granular | Yes < 3% | 1.95 | 2.05 | 0.50 | 1.85 |
| 15 | 97 | 3 | granular | Yes < 3% | 2.25 | 2.05 | 0.50 | 1.9 |

No samples showed any presence of intergranular kappa carbides nor of f3-Mn phase.

TABLE 4

Properties

| Trial | Density | Tensile strength (MPa) | Yield Strength (MPa) | Uniform Elongation (%) |
|---|---|---|---|---|
| 1 | 6.81 | 1068 | 878 | 31.3 |
| 2 | 6.75 | 1065 | 831 | 34.0 |
| 3 | 6.92 | 1067 | 862 | 31.9 |
| 4 | 6.76 | 940 | 660 | 21.4 |
| 5 | 6.75 | 945 | 670 | 24.9 |
| 6 | 6.75 | 979 | 593 | 39.8 |
| 7 | 6.86 | 1090 | 873 | 28.0 |
| 8 | 6.86 | 1102 | 898 | 28.2 |
| 9 | 6.86 | 1102 | 896 | 26.0 |
| 10 | 6.86 | 1120 | 965 | 26.1 |
| 11 | 6.86 | 1129 | 969 | 25.4 |
| 12 | 6.60 | 953 | 804 | 42.0 |
| 13 | 6.78 | 1140 | 1059 | 24.8 |
| 14 | 6.78 | 1100 | 949 | 28.0 |
| 15 | 6.83 | 1023 | 713 | 34.6 |

The examples show that the steel sheets according to the invention are the only ones to show all the targeted properties thanks to their specific composition and microstructures.

What is claimed is:

1. A cold rolled and annealed steel sheet comprising by weight:
   $0.6 \leq C \leq 1.3\%$,
   $28.88 \leq Mn \leq 35\%$,
   $5 \leq Al \leq 12\%$,
   $Si \leq 2.40\%$,
   $S \leq 0.03\%$,
   $P \leq 0.1\%$,
   $N \leq 0.1\%$,
   the remainder of the composition making up of iron and inevitable impurities resulting from elaboration, the microstructure of said sheet comprising optionally up to 3% of kappa carbides, optionally up to 10% of granular ferrite, the remainder being made of austenite, an average grain size of the austenite being below 6 μm, an average aspect ratio of the austenite being between 1.5 and 6, an average grain size of the ferrite, when present, being below 5 μm, and an average aspect ratio of the ferrite, when present, being below 3.0;
   wherein the steel sheet has an ultimate tensile strength of at least 900 MPa, a yield strength of at least 700 MPa and a uniform elongation of at least 30%.

2. The steel sheet according to claim 1, wherein the steel sheet comprises the kappa carbides, and the kappa carbides are intragranular kappa carbides.

3. The steel sheet according to claim 1, comprising $5 \leq Al \leq 10\%$.

4. The steel sheet according to claim 3, wherein the steel sheet has an ultimate tensile strength of at least 1000 MPa, a yield strength of at least 800 MPa and a uniform elongation of at least 30%.

5. The steel sheet according to claim 3, wherein the steel sheet comprises the kappa carbides, the kappa carbides are intragranular kappa carbides, and the microstructure of the steel sheet is free from intergranular kappa carbides.

6. The steel sheet of claim 5, wherein the steel sheet is free from granular ferrite.

7. The steel sheet according to claim 5, wherein the microstructure consists of the intragranular kappa carbides, up to 10% granular ferrite and austenite.

8. The steel sheet according to claim 7, wherein the microstructure consists of the intragranular kappa carbides and austenite.

9. The steel sheet according to claim 3, wherein the uniform elongation is at least 31.3%.

10. The steel sheet according to claim 3, wherein the average aspect ratio of the austenite is between 1.5 and 2.6.

11. The steel sheet according to claim 10, wherein the microstructure comprises 1.3 to 6% granular ferrite.

12. The steel sheet according to claim 1, wherein the composition consists of C, Mn, Al, Si, S, P, N, iron and the inevitable impurities resulting from elaboration.

13. The steel sheet according to claim 1, wherein the microstructure of said steel sheet includes no more than 6% granular ferrite.

14. The steel sheet according to claim 13, wherein the microstructure of said steel sheet is free from intergranular kappa carbides, and the steel sheet has a density below 7.2.

15. The steel sheet according to claim 1, wherein the microstructure of said steel sheet includes no more than 5% granular ferrite.

16. The steel sheet according to claim 1, wherein the microstructure of said steel sheet includes no more than 3% granular ferrite.

17. The steel sheet according to claim 1, wherein the steel sheet further comprises one or more elements chosen among Ni, Cr and Cu in a respective amount of up to 4.0%, up to 3.0% and up to 3.0%.

18. The steel sheet according to claim 17, wherein the steel sheet further comprises one or more elements chosen among B, Ta, Zr, Nb, V, Ti, Mo, and W in a cumulated amount of up to 2.0%.

19. The steel sheet according to claim 17, wherein the respective amount of Cu is below 0.1%.

20. The steel sheet according to claim 1, wherein the steel sheet further comprises one or more elements chosen among B, Ta, Zr, Nb, V, Ti, Mo, and W in a cumulated amount of up to 2.0%.

21. The steel sheet according to claim 1, wherein the carbon content is between 0.8 and 1.0%.

22. The steel sheet according to claim 1, wherein the aluminum content is between 8.5 and 10%.

23. The steel sheet according to claim 1, wherein the steel sheet is covered by a metallic coating.

24. The steel sheet according to claim 1, wherein the steel sheet is covered by an aluminum-based coating or a zinc-based coating.

25. A method for producing the steel sheet according to claim 1, comprising:
   feeding a slab having a composition including, by weight: $0.6 \leq C \leq 1.3\%$, $28.88 \leq Mn \leq 35\%$, $5 \leq Al \leq 12$, $Si \leq 2.40\%$, $S \leq 0.03\%$, $P \leq 0.1\%$, $N \leq 0.1\%$, the remainder of the composition making up of iron and inevitable impurities resulting from elaboration;
   reheating the slab at a temperature above 1000° C. and hot rolling the slab with a final rolling temperature of at least 800° C. to obtain a hot rolled steel sheet;
   coiling the hot rolled steel sheet at a temperature of 400° C. or less;
   cold-rolling such hot rolled steel sheet at a reduction comprised between 30 and 80%;
   performing, in a single annealing step, annealing such cold rolled sheet by heating it up to an annealing temperature between 700 and 1000° C., holding it at such temperature during less than 5 minutes and cooling it at a rate of at least 30° C./s, and thereby producing the steel sheet according to claim 1.

26. The method according to claim 25, wherein the composition further comprises one or more elements chosen among Ni, Cr and Cu in an respective amount of up to 4.0%, up to 3.0% and up to 3.0%.

27. The method according to claim 25, wherein the composition further comprises one or more elements chosen among B, Ta, Zr, Nb, V, Ti, Mo, and W in a cumulated amount of up to 2.0%.

28. The method according to claim 27, wherein the steel sheet further comprises one or more elements chosen among B, Ta, Zr, Nb, V, Ti, Mo, and W in a cumulated amount of up to 2.0%.

29. The method according to claim 25, wherein the annealing temperature is between 800 and 950° C.

30. The method according to claim 25, wherein the coiling temperature is between 350 and 400° C.

31. The method according to claim 25, further comprising applying a metallic coating to said sheet after said cooling.

32. The method according to claim 25, wherein in the single annealing step, the cold rolled sheet is held at the annealing temperature for 1 to 3 minutes.

33. A structural or safety part of a vehicle comprising the steel sheet of claim 1, flexibly rolled into said structural or safety part.

34. A vehicle comprising the part according to claim 33.

35. The steel sheet according to claim 1, comprising $0.8 \leq C \leq 1.3\%$.

* * * * *